(12) United States Patent
Donnelly et al.

(10) Patent No.: US 7,630,860 B1
(45) Date of Patent: Dec. 8, 2009

(54) CONTROLLING PROCESS GROUP EXECUTION ELAPSED TIME THROUGH COMPONENT PERFORMANCE CONTROL

(75) Inventors: Joel King Donnelly, Mission Viejo, CA (US); Michael Alan Gale, Aliso Viejo, CA (US); Andrew David Milligan, Milton Keynes (GB)

(73) Assignee: Unisys Corporation, Blue Bell, PA (US)

( * ) Notice: Subject to any disclaimer, the term of this patent is extended or adjusted under 35 U.S.C. 154(b) by 49 days.

(21) Appl. No.: 11/973,145

(22) Filed: Oct. 5, 2007

(51) Int. Cl.
*G06F 11/00* (2006.01)

(52) U.S. Cl. ...................................... 702/182

(58) Field of Classification Search ................ 702/182; 718/102

See application file for complete search history.

(56) References Cited

U.S. PATENT DOCUMENTS

2008/0134185 A1* 6/2008 Fedorova ................ 718/102

* cited by examiner

*Primary Examiner*—Tung S Lau
*Assistant Examiner*—Xiuquin Sun
(74) *Attorney, Agent, or Firm*—Robert P. Marley; Phuong-Quan Hoang

(57) ABSTRACT

An embodiment of the present invention is a technique to manage elapsed time performance. Current baseline statistics on N performance components are obtained for a set of programs belonging to a single workload group. N current component performance values associated with the N performance components are obtained in a current measurement for the set of programs at the beginning of a current monitoring cycle. A control component is selected from the N performance components based on the current baseline statistics and the N current component performance values. A control value is applied to an operation corresponding to the control component in the set of programs. A next monitoring cycle is waited for.

15 Claims, 9 Drawing Sheets

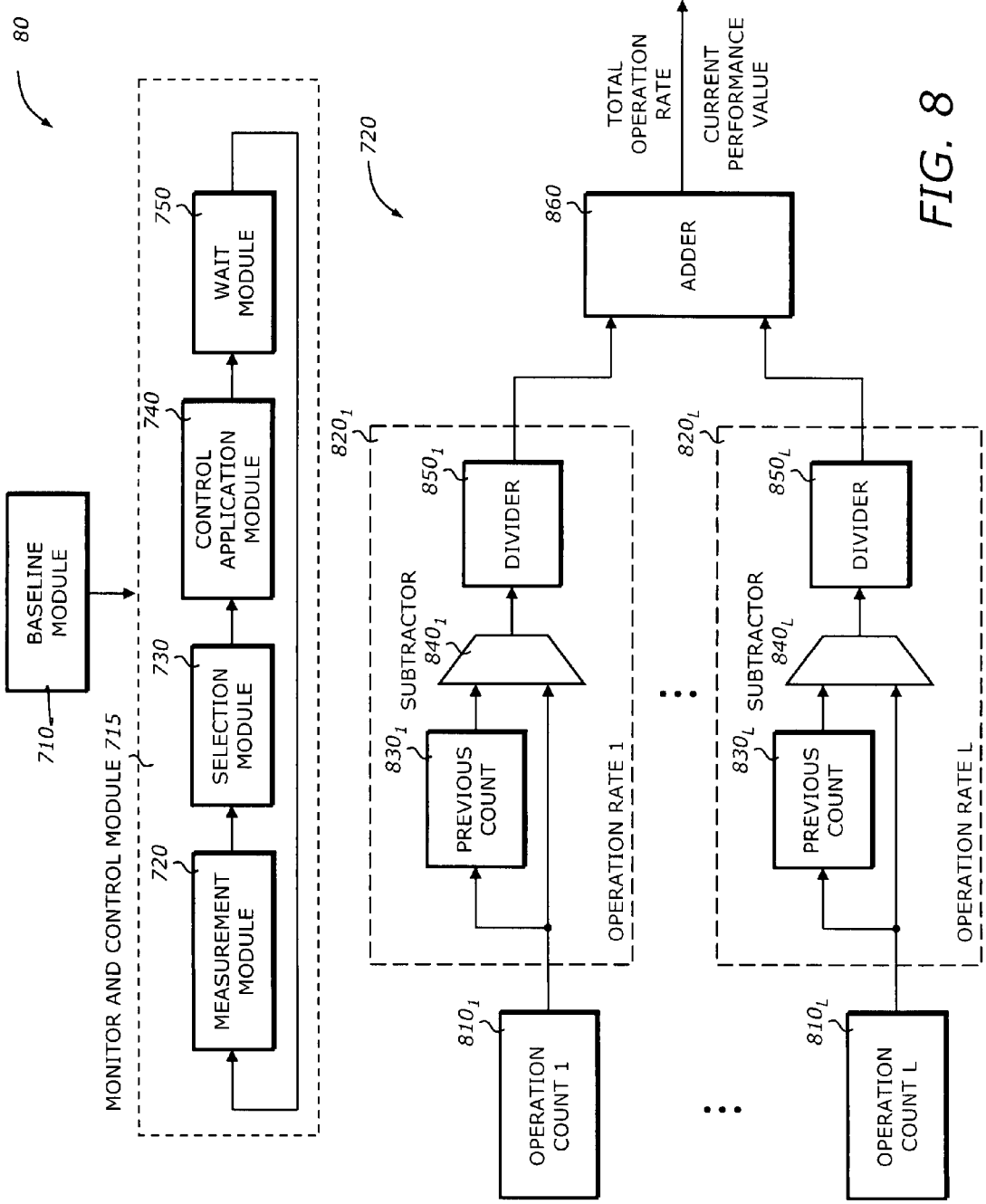

CONTROLLING PROCESS GROUP EXECUTION ELAPSED TIME THROUGH COMPONENT PERFORMANCE CONTROL

CROSS REFERENCE TO RELATED APPLICATIONS

This application is related to the following patent applications: Ser. No. 11/973,138 entitled "Controlling Process Execution Rate Through Input/Output Performance Control"; Ser. No. 11/973,144 entitled "Controlling Data Management System (DMS) Process Execution Rate Through DMS Performance Control"; Ser. No. 11/973,141 entitled "Controlling Transaction Processing Execution Rate Through Processor Performance Control"; Ser. No. 11/973,142 entitled "Data Compaction"; all filed on Oct. 5, 2007 and assigned to the same assignee as the present application, the contents of each of which are herein incorporated by reference.

BACKGROUND

1. Field of the Invention

Embodiments of the invention relate to the field of computer performance, and more specifically, to performance management.

2. Description of Related Art

The performance of a computer system depends on a variety of factors. These factors include workload demands, system resources, scheduling policy, degree of parallelism and/or multiprogramming, etc. It is desirable to monitor the computer-performance to maximize processor utilization and optimize resource allocation.

Typically, system resources have been allocated among running programs by means of a priority-based process scheduler. Each process is assigned a priority and available processors are allocated to the highest priority processes waiting for a processor. The behavior of the process scheduler can be further refined by setting other system parameters. Although this mechanism may work well for some systems, there are circumstances where it presents difficulties.

One problem with the fixed priority-based process scheduling is the uncertainty in determining a suitable set of process priorities and system parameter settings for a given workload. Another problem is the difficulty in predicting the likely effects when an adjustment is made to the system parameters. More importantly, when the workload is changed, the system may not respond effectively, leading to inefficient resource allocation and unpredictability of system performance.

SUMMARY OF THE INVENTION

An embodiment of the present invention is a technique to manage elapsed time performance. Current baseline statistics on N performance components are obtained for a set of programs belonging to a single workload group. N current component performance values associated with the N performance components are obtained in a current measurement for the set of programs at the beginning of a current monitoring cycle. A control component is selected from the N performance components based on the current baseline statistics and the N current component performance values. A control value is applied to an operation corresponding to the control component in the set of programs. A next monitoring cycle is waited for.

BRIEF DESCRIPTION OF THE DRAWINGS

The invention may best be understood by referring to the following description and accompanying drawings that are used to illustrate embodiments of the invention. In the drawings:

FIG. 7 is a diagram illustrating a workload performance manager according to one embodiment of the invention.

FIG. 8 is a diagram illustrating a measurement module according to one embodiment of the invention.

DESCRIPTION

Figure 1A:
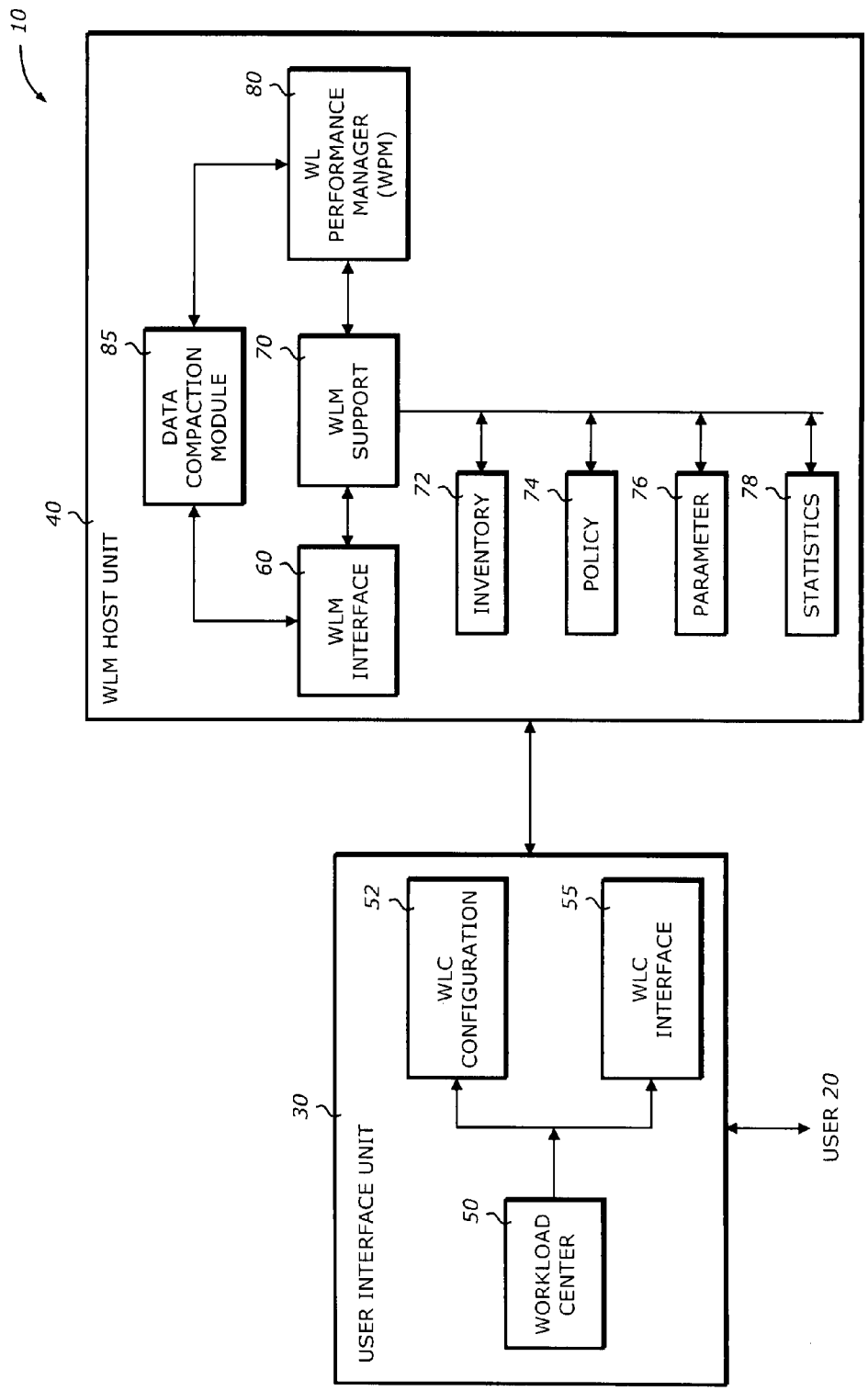
FIG. 1A is a diagram illustrating a system in which one embodiment of the invention can be practiced.

An embodiment of the present invention is a technique to manage elapsed time performance. Current baseline statistics on N performance components are obtained for a set of programs belonging to a single workload group. N current component performance values associated with the N performance components are obtained in a current measurement for the set of programs at the beginning of a current monitoring cycle. A control component is selected from the N performance components based on the current baseline statistics and the N current component performance values. A control value is applied to an operation corresponding to the control component in the set of programs. A next monitoring cycle is waited for.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the invention may be described as a process, which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process terminates when its operations are completed. A process may correspond to a method, a program, a procedure, etc. A block diagram may contain blocks or modules that describe an element, an item, a component, a device, a unit, a subunit, a structure, a method, a process, a function, an operation, a functionality, or a task, etc. A functionality or an operation may be performed automatically or manually.

One embodiment of the invention is a technique to manage performance goal monitoring in a workload management system. The primary objective of the workload management system is to allow the system administrator to regulate the performance of business critical applications using business level rules, referred to as workload performance goals, such that the applications provide the specified levels of service. A workload performance manager then automatically adjusts the system resources such as the central processing unit (CPU) to balance these business critical applications.

One embodiment of the invention involves a preliminary configuration process where the user defines the workload groups, workload performance goals, and policies, and then also a means of monitoring the workload performance manager and the underlying workloads.

In general, if the workload performance goal of an application is not being met and if the processes comprising that application can benefit from more resources, then more resources may be allocated to those processes. If there are no resources available, but another application is overachieving and consequently consuming more resources than it actually needs, resources may then be diverted away from that overachiever. If resources become so scarce that not all workload performance goals can be met, then the least important goal is sacrificed to make resources available to meet the other goals. If there are still not enough resources, the second least important goal is sacrificed and so on until the remaining goals can be met, or until there is only one goal left and there are still not enough resources available.

FIG. 1A is a diagram illustrating a system 10 in which one embodiment of the invention can be practiced. The system 10 includes a user 20, a user interface unit 30 and a workload management (WLM) host unit 40. The system 10 may be used in a variety of computing environments such as business, enterprise, engineering and science, etc.

The user interface unit 30 provides an interface between the user 20 and the host unit 40. The user 20 may be any user of the workload management. The user 20 may be a system administrator, an application user, or any user who has administrative responsibilities for running the workload management. The user interface unit 30 may be a unit separated from or integrated with the host unit 40. In one embodiment, the user interface unit 30 is a personal computer (PC) separated from the host unit 40. The user interface unit 30 may run on any suitable operating system such as Microsoft Windows, Unix, or Linux. It may also interface to multiple WLM host units similar to the host unit 40. The user interface unit 30 includes a workload center (WLC) 50, a WLC configuration 52, and a WLC interface 55.

The WLC 50 manages the communication between the user 20 and the host unit 40. It may configure user preferences or the communication protocol. It may process user inputs and provides responses to the user 20. The WLC configuration 52 may contain user preferences or any other user interface set-ups. The WLC interface 55 prepares and formats any communication from the WLC 50 to send to the host unit 40. It may process any messages or responses provided by the host unit 40.

The WLM host unit 40 provides the platform for workload and performance management. It may be a server, a computing system, a workstation, or any system that has a need for workload and/or performance management. It includes a WLM interface 60, a WLM support 70, a WL performance manager (WPM) 80, and a data compaction module 85. The WLM interface 60 provides interface between the host unit 40 and the user interface unit 30. The WLM Support 70 provides support for workload and performance management. It may interact with several WL components such as an inventory component 72, a policy component 74, a parameters component 76, and a statistics component 78. The WPM 80 manages the performance monitoring for the business critical applications. The WPM 80 may be a module, a program, or a functionality that may be executed by a processor of the WLM host unit 40. The data compaction module 85 performs data compaction on the data collected from measurements during performance monitoring.

The communication between the user interface unit 30 and the WLM host unit 40 may be represented by a series of messages. A message may be a command message sent from the user interface unit 30 to the host unit 40, or a response sent from the host unit 40 to the user interface unit 30. The message may be written using a markup language such as eXtensible markup language (XML). The command message may include an action code to request the workload management system to perform specified task. The response message may include status (e.g., failure, success) and request-specific data objects.

Figure 1B:
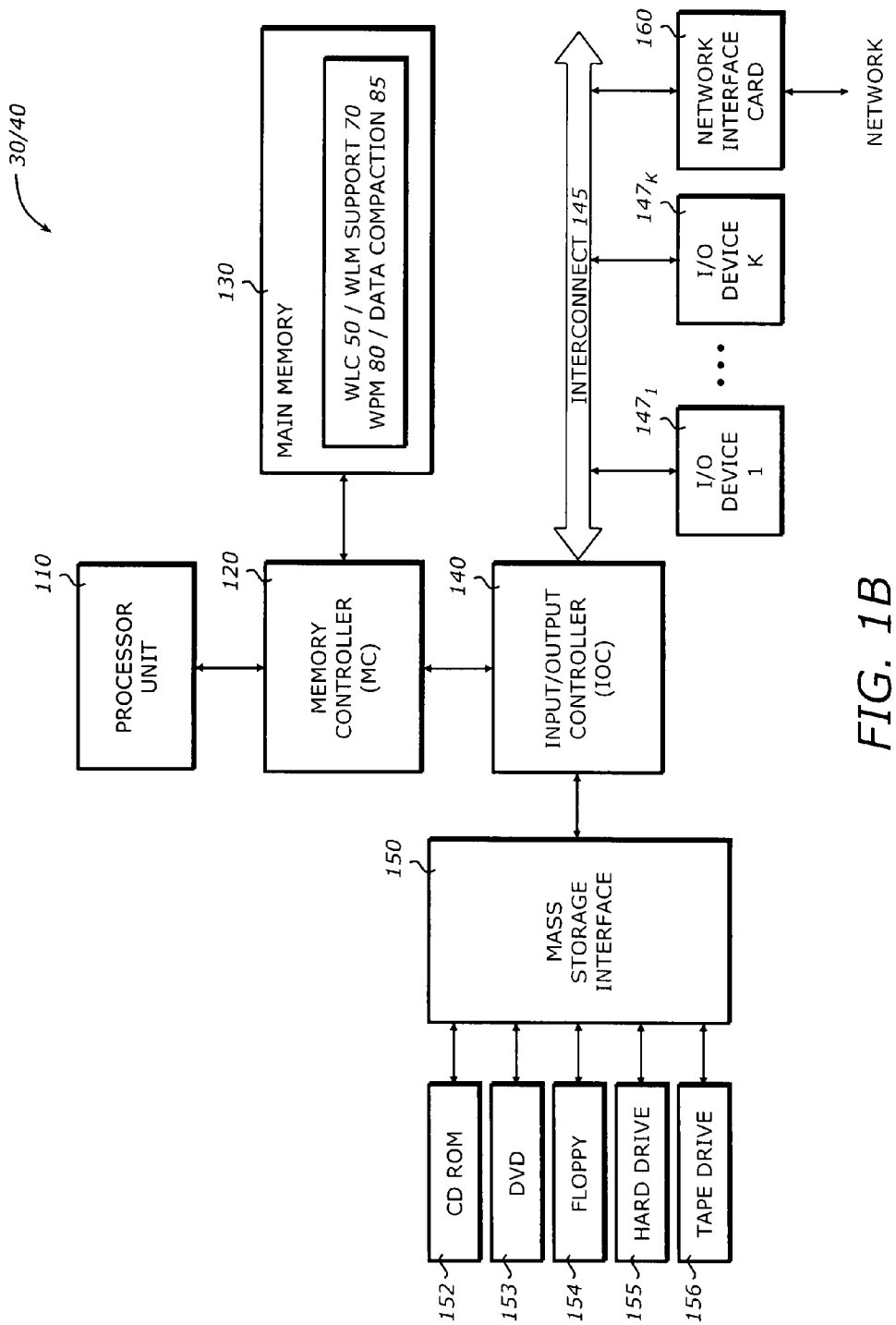
FIG. 1B is a diagram illustrating a user interface unit/host unit according to one embodiment of the invention.

FIG. 1B is a diagram illustrating the unit 30/40 in which one embodiment of the invention can be practiced. The unit 30/40 includes a processor unit 110, a memory controller (MC) 120, a main memory 130, an input/output controller (IOC) 140, an interconnect 145, a mass storage interface 150, input/output (I/O) devices 147$_1$ to 147$_K$, and a network interface card (NIC) 160. The unit 30/40 may include more or less of the above components.

The processor unit 110 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MC 120 provides control and configuration of memory and input/output devices such as the main memory 130 and the IOC 140. The MC 120 may be integrated into a chipset that integrates multiple functionalities such as graphics, media, isolated execution mode, host-to-peripheral bus interface, memory control, power management, etc. The MC 120 or the memory controller functionality in the MC 120 may be integrated in the processor unit 110. In some embodiments, the memory controller, either internal or external to the processor unit 110, may work for all cores or processors in the processor unit 110. In other embodiments, it may include different portions that may work separately for different cores or processors in the processor unit 110.

The main memory 130 stores system code and data. The main memory 130 is typically implemented with dynamic random access memory (DRAM), static random access memory (SRAM), or any other types of memories including those that do not need to be refreshed. The main memory 130 may include multiple channels of memory devices such as DRAMs. The DRAMs may include Double Data Rate (DDR2) devices with a bandwidth of 8.5 Gigabyte per second (GB/s). In one embodiment, the memory 130 may include the WLC 50, the WLM support 70, the WPM 80, or the data compaction module 85 shown in FIG. 1A and the associated modules or functions. The WLC 50, the WLM support 70, the WPM 80, or the data compaction module 85 may be fully or partly implemented by hardware, firmware, or software, or any combination thereof. In addition, it may be fully or partly located in the memory 130. The WLC 50, the WLM support 70 the WPM 80, or the data compaction module 85 may include functions, modules, programs, procedures, or methods that perform the functions described below. These functions may include, but are not limited to, execution rate control through performance control for input/output, data management subsystem, and transaction processing operations, execution elapsed time control through component performance control, data compaction, communication between the user interface unit 30 and the host unit 40 using a markup language formatted data, WLC flow control, WLM support flow control, performance goals, performance monitoring and adjustment, policy scheduling, processor rate bias usage, and workload group segmentation.

The IOC 140 has a number of functionalities that are designed to Support I/O functions. The IOC 140 may also be integrated into a chipset together or separate from the MC 120 to perform I/O functions. The IOC 140 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc.

The interconnect 145 provides interface to peripheral devices. The interconnect 145 may be point-to-point or connected to multiple devices. For clarity, not all interconnects are shown. It is contemplated that the interconnect 145 may include any interconnect or bus such as Peripheral Component Interconnect (PCI), PCI Express, Universal Serial Bus (USB), Small Computer System Interface (SCSI), serial SCSI, and Direct Media Interface (DMI), etc.

The mass storage interface 150 interfaces to mass storage devices to store archive information such as code, programs, files, data, and applications. The mass storage interface may include SCSI, serial SCSI, Advanced Technology Attachment (ATA) (parallel and/or serial), Integrated Drive Electronics (IDE), enhanced IDE, ATA Packet Interface (ATAPI), etc. The mass storage device may include compact disk (CD) read-only memory (ROM) 152, digital video/versatile disc (DVD) 153, floppy drive 154, hard drive 155, tape drive 156, and any other magnetic or optic storage devices. The mass storage device provides a mechanism to read machine-accessible media.

The I/O devices $147_1$ to $147_K$ may include any I/O devices to perform I/O functions. Examples of I/O devices $147_1$ to $147_K$ include controller for input devices (e.g., keyboard, mouse, trackball, pointing device), media card (e.g., audio, video, graphic), and any other peripheral controllers.

The NIC 160 provides network connectivity to the client server 30. The NIC 160 may generate interrupts as part of the processing of communication transactions. In one embodiment, the NIC 160 is compatible with both 32-bit and 64-bit peripheral component interconnect (PCI) bus standards. It is typically compliant with PCI local bus revision 2.2, PCI-X local bus revision 1.0, or PCI-Express standards. There may be more than one NIC 160 in the processing system. Typically, the NIC 160 Supports standard Ethernet minimum and maximum frame sizes (64 to 1518 bytes), frame format, and Institute of Electronics and Electrical Engineers (IEEE) 802.2 Local Link Control (LLC) specifications. It may also Support full-duplex Gigabit Ethernet interface, frame-based flow control, and other standards defining the physical layer and data link layer of wired Ethernet. It may support copper Gigabit Ethernet defined by IEEE 802.3ab or fiber-optic Gigabit Ethernet defined by IEEE 802.3z.

The NIC 160 may also be a host bus adapter (HBA) Such as a Small Computer System Interface (SCSI) host adapter or a Fiber Channel (FC) host adapter. The SCSI host adapter may contain hardware and firmware on board to execute SCSI transactions or an adapter Basic Input/Output System (BIOS) to boot from a SCSI device or configure the SCSI host adapter. The FC host adapter may be used to interface to a Fiber Channel bus. It may operate at high speed (e.g., 2 Gbps) with auto speed negotiation with 1 Gbps Fiber Channel Storage Area Network (SANs). It may be supported by appropriate firmware or software to provide discovery, reporting, and management of local and remote HBAs with both in-band FC or out-of-band Internet Protocol (IP) support. It may have frame level multiplexing and out of order frame reassembly, on-board context cache for fabric support, and end-to-end data protection with hardware parity and cyclic redundancy code (CRC) support.

The elapsed time performance goal allows a user to configure a performance goal related to the elapsed time, or specify the desired completion time for all tasks, or processes, assigned to a workload group. The total number of the tasks, or processes, assigned to the workload group may be referred to as the job, which starts when the first task in the group begins and ends when the last task is completed. There may be N performance components that may affect the completion time of a process. These components are expected to be used or performed by the job. Examples of the performance components include processor time component, input/output component, and database management component. Together, these component values represent the size of the total job.

Figure 2A:
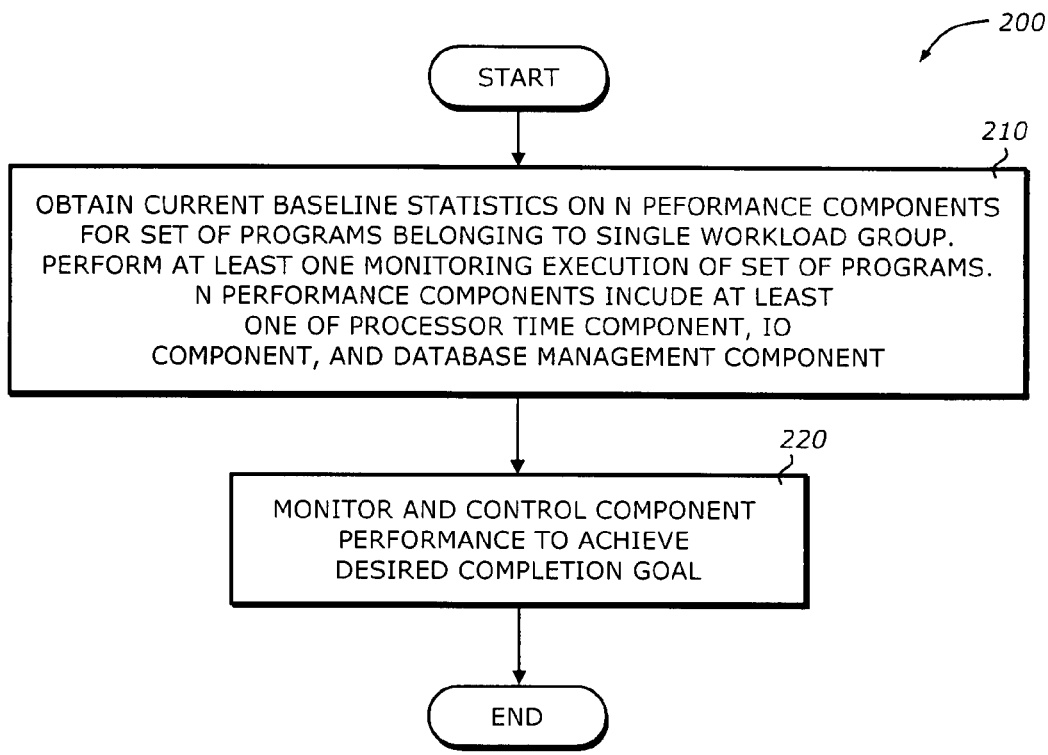
FIG. 2A is a flowchart illustrating a process to manage elapsed time performance for workload management according to one embodiment of the invention.

FIG. 2A is a flowchart illustrating a process 200 to manage elapsed time performance for workload management according to one embodiment of the invention. The process 200 may be performed by the WPM 80 as shown in FIG. 1A. The process 200 may be implemented by software, hardware, firmware, or any combination of software, hardware, and firmware.

Upon START, the process 200 obtains current baseline statistics on N performance components for a set of programs belonging to a single workload group (Block 210). This can be performed by performing at least one monitoring execution of the set of programs. The N performance components include at least one of a processor time component, an input/output (IO) component, and a database management component. In one embodiment, all three performance components are used. The processor time component is associated with operations that involve processor time. The IO component is associated with IO operations. The database management component is associated with data management system (DMS) operations such as physical read/write and buffer operations.

Next, the process 200 monitors and controls component performance (Block 220). The process 200 monitors all the performance components and controls the performance component that is selected to best achieve a desired completion time. The process 200 is then terminated.

Figure 2B:
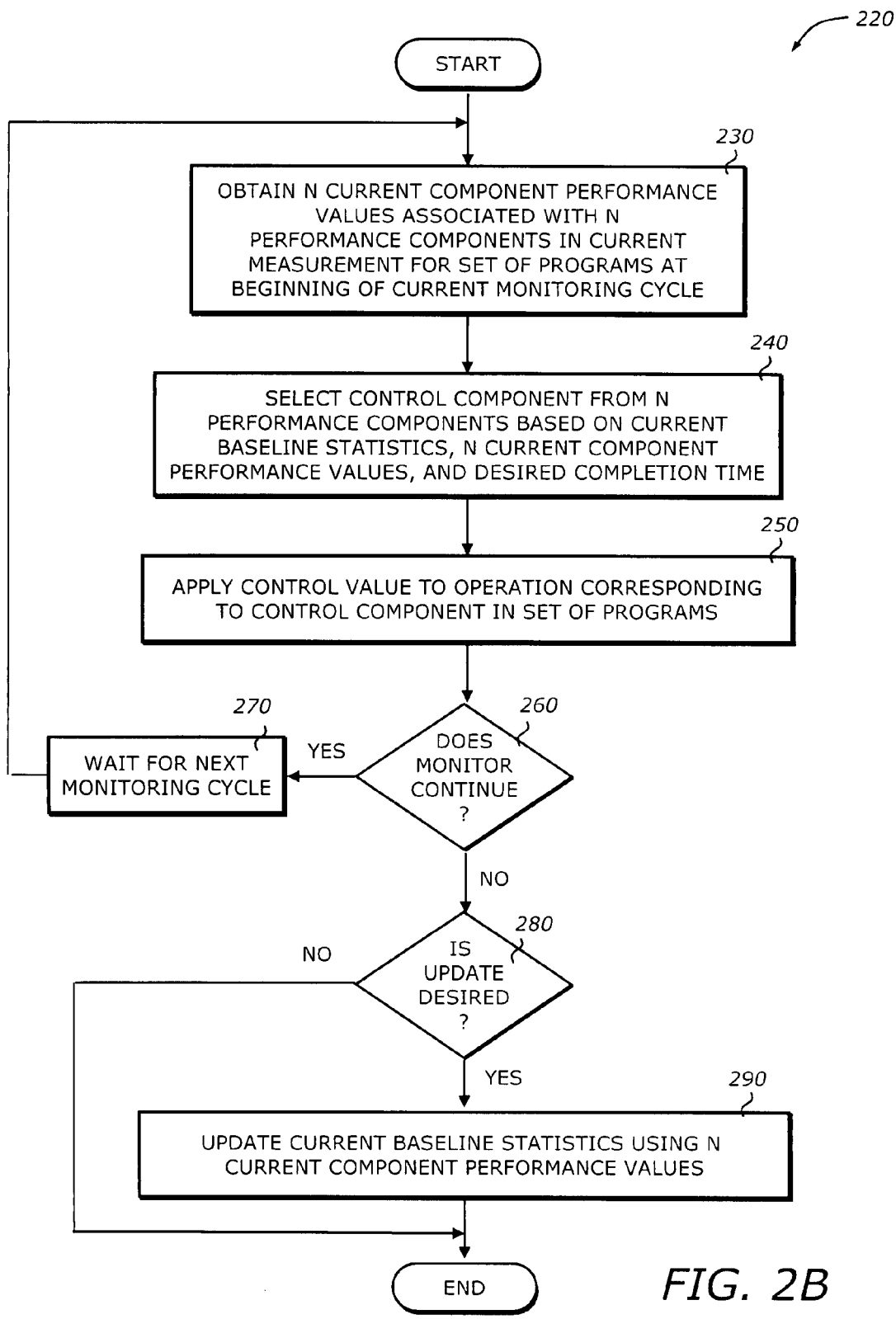
FIG. 2B is a flowchart illustrating a process to monitor and control component performance according to one embodiment of the invention.

FIG. 2B is a flowchart illustrating the process 220 shown in FIG. 2A to monitor and control component performance according to one embodiment of the invention.

Upon START, the process 220 obtains N current component performance values associated with the N performance components in a current measurement for the set of programs at beginning of a current monitoring cycle (Block 230). Then, the process 220 selects a control component from the N performance components based on the current baseline statistics, the N current component performance values, and a configured goal for a desired completion time (Block 240). The desired completion time represents the elapsed time and may be provided by the user during configuration. Next, the process 220 applies a control value to an operation corresponding to the control component in the set of programs (Block 250). This may be performed by calculating the control value corresponding to the performance component. For the processor time, IO, and database management components, the control value may be a processor control value, an IO delay value, and a DMS delay value, respectively.

Next, the process 220 determines if the performance monitor continues (Block 260). If so, the process 220 waits for a next monitoring cycle (Block 270) and returns to Block 220. Otherwise, the process 220 determines if baseline update is desired (Block 280). This may be provided as an option for user's selection. If update is desired, the process 220 updates the current baseline statistics using the N current component performance values (Block 290) and is then terminated.

Figure 3:
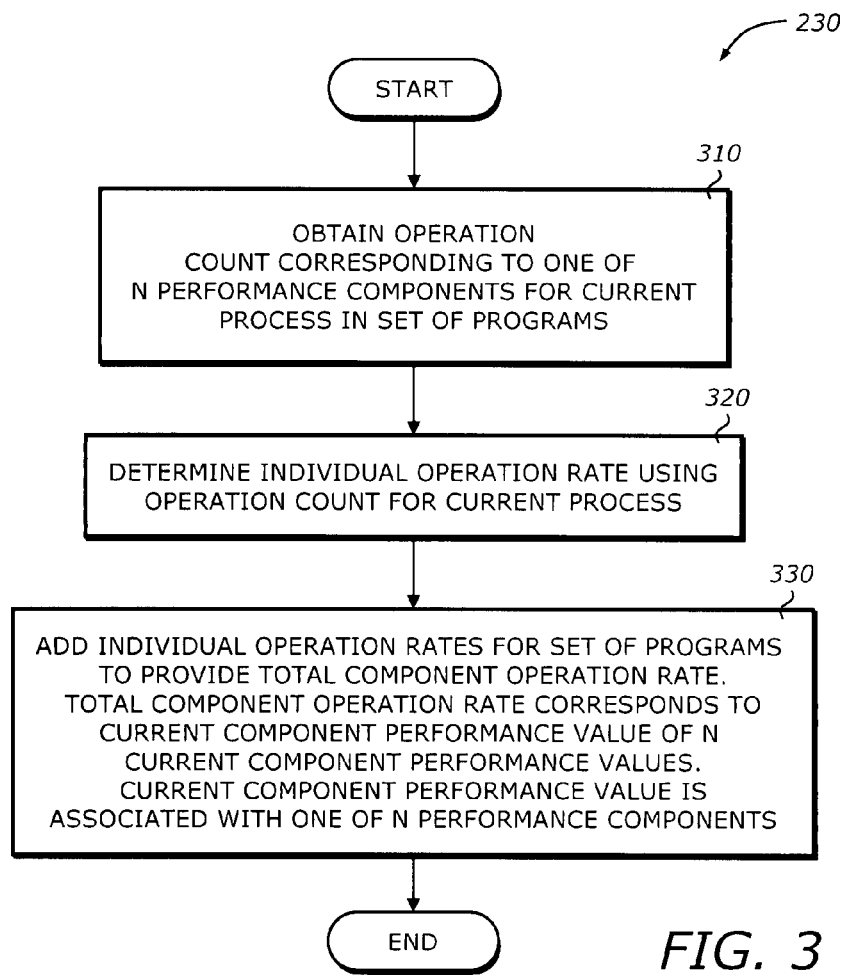
FIG. 3 is a flowchart illustrating a process to obtain N current component performance value according to one embodiment of the invention.

FIG. 3 is a flowchart illustrating the process 230 shown in FIG. 2B to obtain the N current component performance values according to one embodiment of the invention.

Upon START, the process 230 obtains an operation Count corresponding to one of the N performance components for a current process in the set of programs (Block 310). The operation count is obtained for each of the performance components. For example, for the IO component, the operation count is the number of IO operations. For the database management component, the operation count is the number of data management system (DMS) operations. Next, the process 230 determines an individual operation rate using the operation count for the current process (Block 320). Then, the process 230 adds individual operation rates for the set of programs to provide a total component operation rate (Block 330). The total component operation rate corresponds to a current component performance value of the N current component performance values. The current component performance value is associated with the one of the N performance components. For example, a processor time performance value is associated with the processor time component; an IO performance value is associated with the IO component; and a DMS performance value is associated with the database management component.

Figure 4:
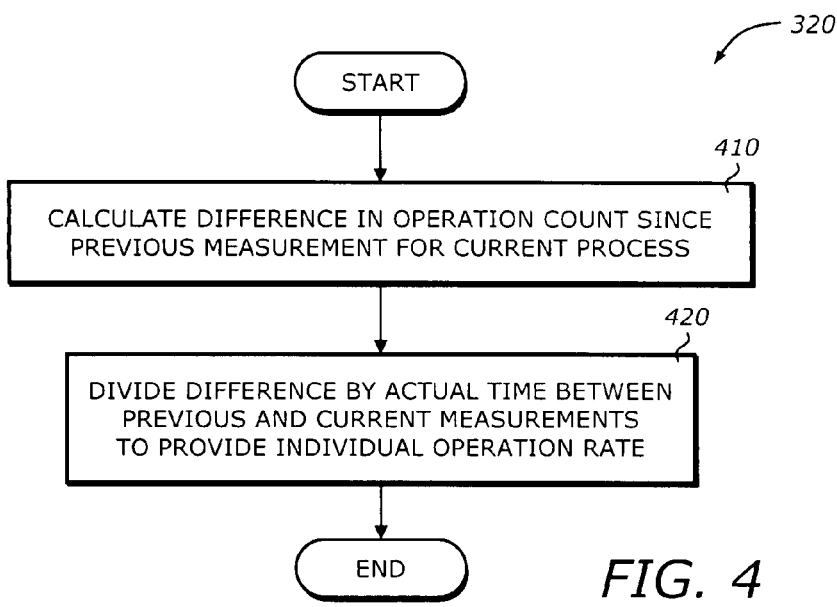
FIG. 4 is a flowchart illustrating a process to determine an individual operation rate according to one embodiment of the invention.

FIG. 4 is a flowchart illustrating the process 320 shown in FIG. 3 to determine an individual operation rate according to one embodiment of the invention.

Upon START, the process 320 calculates a difference in the operation Count since a previous measurement for the program (Block 410). This difference is the difference between the number of operations performed in the previous measurement and the number of operations performed in the current measurement. The previous measurement may be made in the previous monitoring cycle, or in any other previous monitoring cycle that an accurate time recording was made. Next, the process 320 divides the difference by an actual time between the previous and the current measurements to provide the individual operation rate (Block 420). The process 320 is then terminated.

Figure 5:
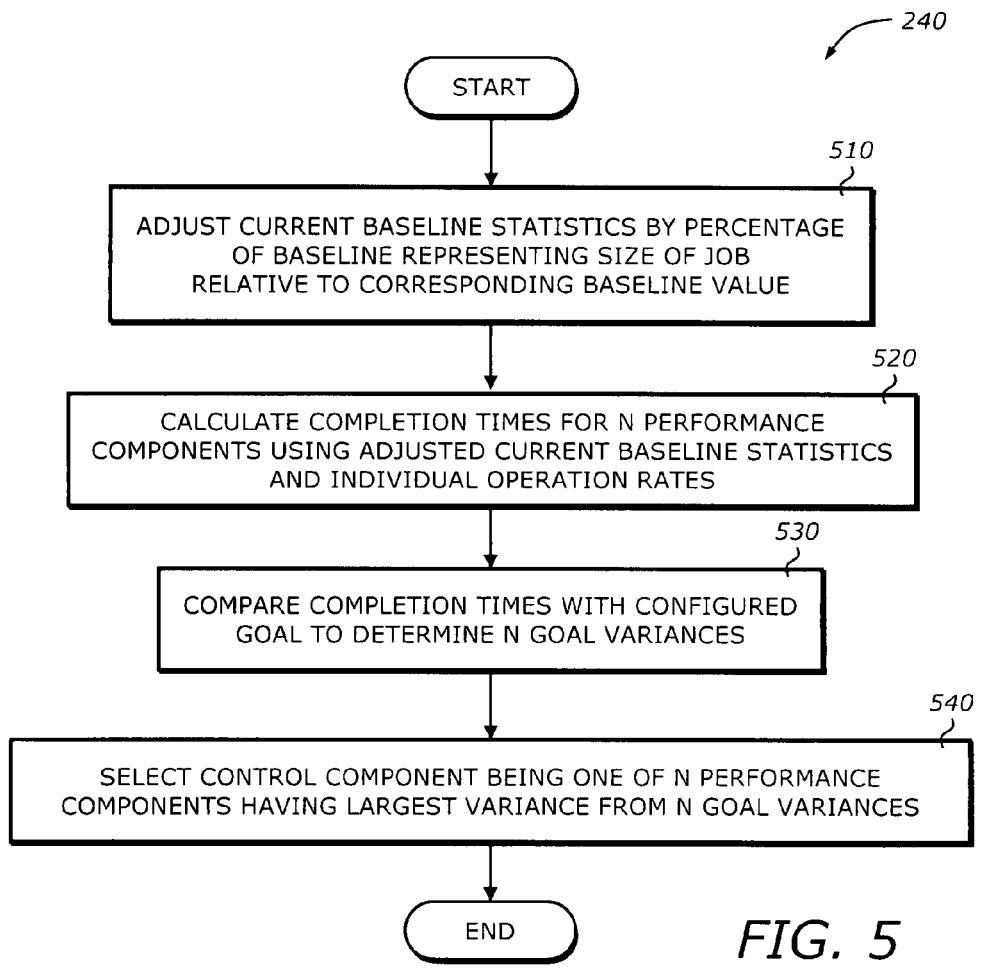
FIG. 5 is a flowchart illustrating a process to select a control component according to one embodiment of the invention.

FIG. 5 is a flowchart illustrating the process 240 shown in FIG. 2B to select a control component from the N performance components according to one embodiment of the invention.

Upon START, the process 240 adjusts the current baseline statistics by a percentage of baseline representing a size of this job relative to a corresponding baseline value (Block 510). The percentage may be represented by a number from 0 to 999 corresponding to 0% to 999%. Next, the process 240 calculates completion times for the N performance components using the adjusted current baseline statistics and the individual operation rates as provided by block 320 in FIG. 3 (Block 520). Then, the process 240 compares the completion times with the configured goal to determine N goal variances (Block 530). Next, the process 240 selects the control component being one of the N performance components having a largest variance from the N goal variances (Block 540). The process 240 is then terminated.

Figure 6:
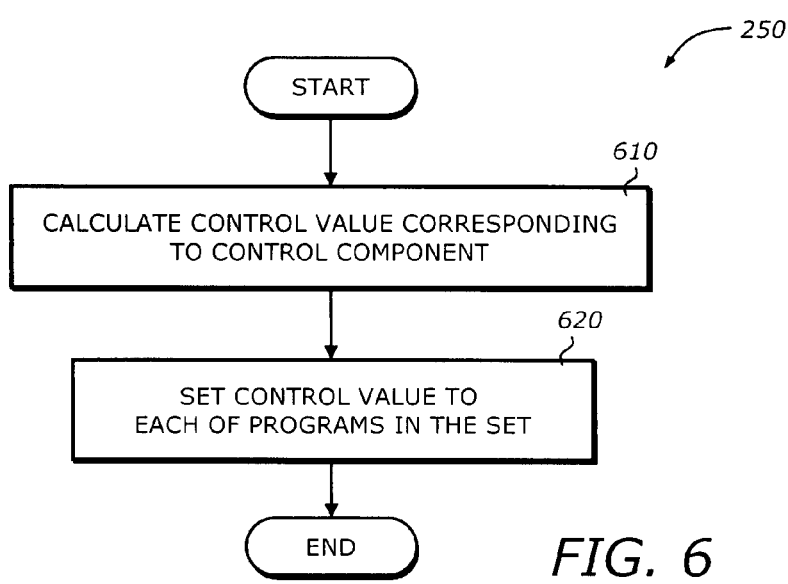
FIG. 6 is a flowchart illustrating a process to apply a control value according to one embodiment of the invention.

FIG. 6 is a flowchart illustrating the process 250 shown in FIG. 2B to apply the control value according to one embodiment of the invention.

Upon START, the process 250 calculates the control value corresponding to the control component (Block 610). For example, if the control component is the processor time component, the process 250 calculates a processor control value; if the control component is the IO component, the process 250 calculates an IO delay value; and if the control component is the database management component, the process 250 calculates a DMS delay value.

Next, the process 250 applies the control value to the operation corresponding to the control component in each of the programs, or processes, in the set of programs (Block 620). The process 250 may apply the control value to the operations associated with the control component accordingly. The process 250 is then terminated.

The flowcharts shown in FIGS. 2A/2B through 6 illustrate the processes performed by the WPM 80. These processes may be implemented by software, hardware, firmware, or any combination of software, hardware, and firmware. Accordingly, they may represent modules which may correspond to a program, a method, a function, a circuit, a microcode sequence, etc. For a software or firmware implementation, a module may include instructions that are stored in a memory and are executed by a processor such as the processor shown in FIG. 1B.

FIG. 7 is a diagram illustrating the WPM 80 shown in FIG. 1A according to one embodiment of the invention. The WPM 80 includes a baseline module 710 and a monitor and control module 715. These modules may correspond to the process blocks as shown in FIGS. 2A/2B.

The baseline module 710 obtains current baseline statistics on N performance components for a set of programs belonging to a single workload group. The baseline statistics are used in the performance monitor module 715. The monitor and control module 715 includes a measurement module 720, a selection module 730, a control application module 740, and a wait module 750.

The measurement module 720 obtains N current component performance values associated with the N performance components in a current measurement for the set of programs at beginning of a current monitoring cycle. The selection module 730 is coupled to the baseline module 710 and the measurement module 720 to select a control component from the N performance components based on the current baseline statistics, the N current component performance values, and a configured goal for a desired completion time. The control application module 740 is coupled to the selection module 730 to apply a control value to an operation corresponding to the control component in the set of programs. The wait module 750 waits for a next monitoring cycle.

FIG. 8 is a diagram illustrating the measurement module 720 shown in FIG. 6 according to one embodiment of the invention. The measurement module 720 includes L operation count modules $810_1$ to $810_L$, L operation rate modules $820_1$ to $820_L$, and an adder 860. L represents the number of processes or programs in the set of programs. It is contemplated that although L modules are shown for each function, there may be only one module which performs the same task L times for the L processes.

Each of the operation count modules $810_1$ to $810_L$ obtains an operation Count for a program in the set of programs. Each of the operation rate modules $820_1$ to $820_L$ determines an individual operation rate using the operation count for the program. The adder 860 adds individual operation rates for the set of programs to provide a total component operation rate. The total component operation rate corresponds to the current performance value.

Each of the operation rate modules $820_1$ to $820_L$ includes a previous count register $830_k$, a subtractor $840_k$, and a divider $850_k$ where $k=1, \ldots, L$. The previous count register $830_k$ stores an operation count in a previous measurement. The subtractor $840_k$ calculates a difference in the operation count since a previous measurement for the program or process k. The divider $850_k$ divides the difference by an actual time between the previous and the current measurements to provide the individual operation rate.

Figure 9:
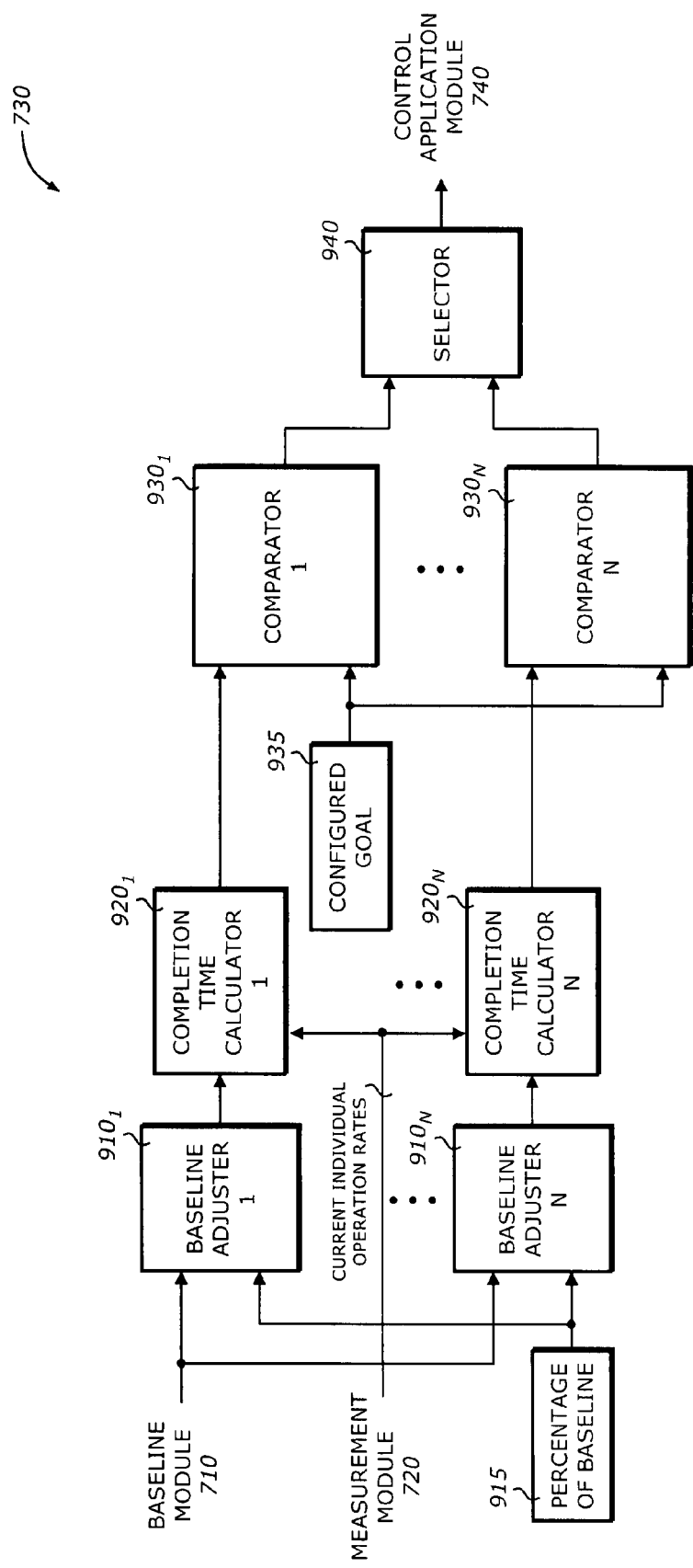
FIG. 9 is a diagram illustrating a selection module according to one embodiment of the invention.

FIG. 9 is a diagram illustrating the selection module 730 shown in FIG. 7 according to one embodiment of the invention. The selection module 730 includes N baseline adjusters $910_1$ to $910_N$, N completion time calculators $920_1$ to $920_N$, N comparators $930_1$ to $930_N$, and a selector 940. N is the number of performance components. It is contemplated that although N modules are shown for each function, there may be only one module which performs the same task N times for the N performance components.

Each of the baseline adjusters $910_1$ to $910_N$ adjusts the current baseline statistics by a percentage of baseline 915 representing a size of this job relative to a corresponding baseline value. Each of the N completion time calculators $920_1$ to $920_N$ is coupled to a corresponding baseline adjuster to calculate the completion time for the associated performance component using the adjusted current baseline statistics and the current individual operation rates. Each of the N comparators $930_1$ to $930_N$ is coupled to a corresponding completion time calculator to compare the component completion time with a configured goal 935 to determine a goal variance with respect to that component. For N components, there are N goal variances. The selector 940 selects the control component as the one of the N performance components having a largest variance from the N goal variances. The control application module 740 then computes a control value for the control component according to the specific procedure for that component, and applies this control value to an operation associated with the component as appropriate.

Figure 10:
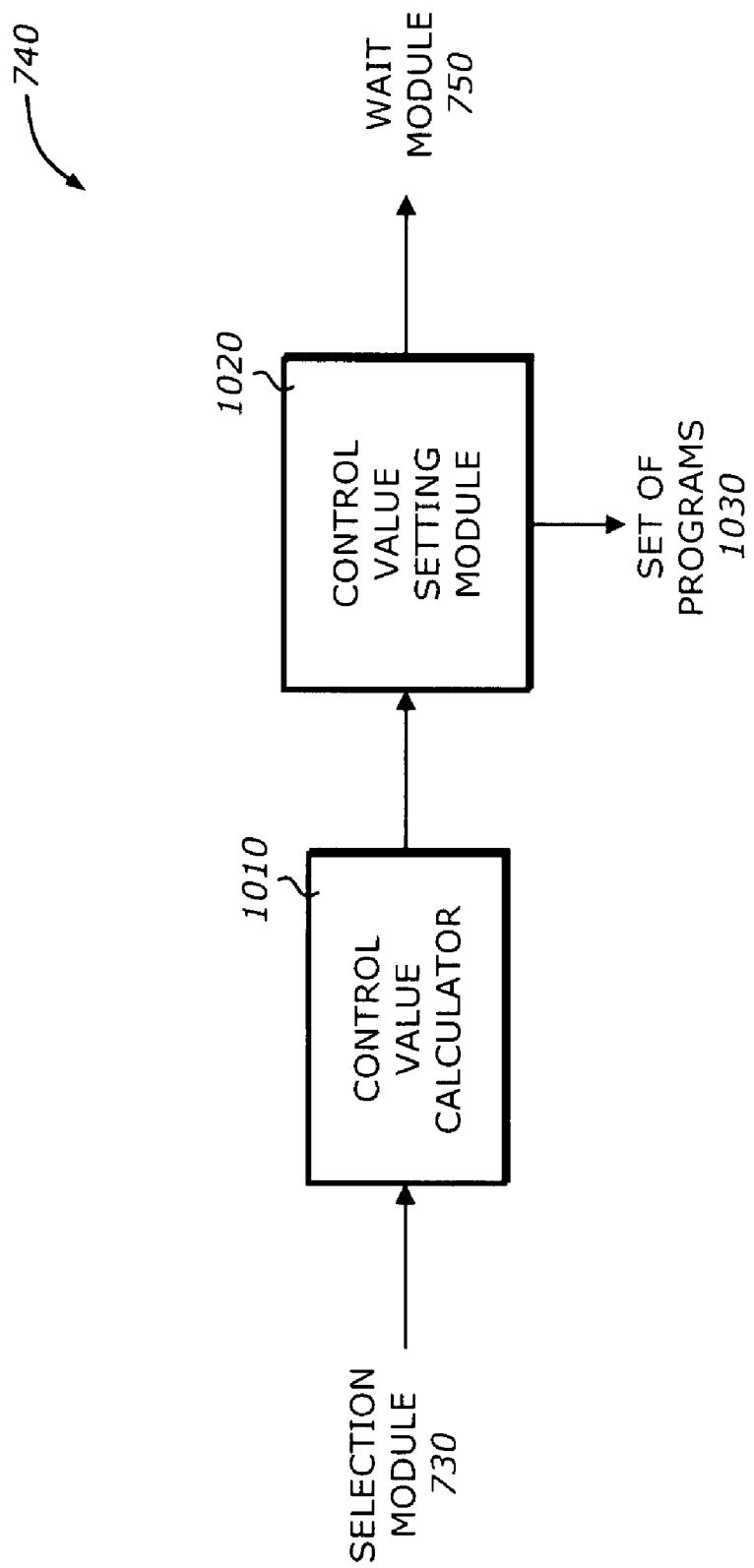
FIG. 10 is a diagram illustrating a control application module according to one embodiment of the invention.

FIG. 10 is a diagram illustrating the control application module 740 shown in FIG. 7 according to one embodiment of the invention. The control application module 730 includes a control value calculator 1010 and a control value setting module 1020.

The control value calculator 1010 calculates the control value corresponding to the control component. The control value setting module 1020 applies the control value to an operation corresponding to the control component in the set of programs 1030.

Elements of embodiments of the invention may be implemented by hardware, firmware, software or any combination thereof. The term hardware generally refers to an element having a physical structure such as electronic, electromagnetic, optical, electro-optical, mechanical, electro-mechanical parts, components, or devices, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments may be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), an erasable programmable ROM (EPROM), a floppy diskette, a compact disk (CD) ROM, an optical disk, a hard disk, a fiber optic medium, a radio frequency (RF) link, etc. The machine accessible medium may be embodied in an article of manufacture. The machine accessible medium may include data that, when accessed by a machine, cause the machine to perform the operations described above. The machine accessible medium may also include program code embedded therein. The program code may include machine readable code to perform the operations described above.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A computer implemented method of executing software within a computing system comprising:
   obtaining current baseline statistics on N performance components for a set of programs belonging to a single workload group;

obtaining N current component performance values associated with the N performance components in a current measurement for the set of programs at beginning of a current monitoring cycle;

calling a get-status procedure for the current monitoring cycle to obtaining an operation count corresponding to one of the N performance components for a current process in the set of programs;

determining an individual operation rate by calculating a difference in the operation count since a previous measurement for the current process and then dividing the difference by an actual time between the previous and the current measurements to provide the individual operation rate;

adding individual operation rates for the set of programs to provide a total operation rate, the total operation rate corresponding to a current component performance value of the N current component performance values, the current component performance value being associated with the one of the N performance components;

selecting a control component from the N performance components based on the current baseline statistics, the N current component performance values, and a configured goal for a desired completion time;

applying a control value to an operation corresponding to the control component in the set of programs; and waiting for a next monitoring cycle.

2. The method of claim 1 wherein selecting the control component comprises:

adjusting the current baseline statistics by a percentage of baseline representing a size of a next job relative to a corresponding baseline value;

calculating completion times for the N performance components using the adjusted current baseline statistics and the individual operation rates;

comparing the completion times with the configured goal to determine N goal variances; and selecting the control component being one of the N performance components having a largest variance from the N goal variances.

3. The method of claim 1 wherein applying a control value comprises:

calculating the control value corresponding to the control component; and calling a set-status procedure to applying the control value to the operation each program in the set of programs.

4. The method of claim 1 wherein the N performance components include at least more than one of a processor time component, an input/output (IO) component, and a database management component.

5. The method of claim 1 wherein obtaining the current baseline statistics comprises:

performing at least one monitoring execution of the set of programs.

6. An article of manufacture comprising:

a machine-accessible medium including data that, when accessed by a machine, causes the machine to perform operations comprising:

obtaining current baseline statistics on N performance components for a set of programs belonging to a single workload group;

obtaining N current component performance values associated with the N performance components in a current measurement for the set of programs at beginning of a current monitoring cycle;

calling a get-status procedure for the current monitoring cycle to obtaining an operation count corresponding to one of the N performance components for a current process in the set of programs;

determining an individual operation rate using the operation count for the current process;

adding individual operation rates for the set of programs to provide a total operation rate, the total operation rate corresponding to a current component performance value of the N current component performance values, the current component performance value being associated with the one of the N performance components selecting a control component from the N performance components based on the current baseline statistics, the N current component performance values, and a configured goal for a desired completion time;

applying a control value to an operation corresponding to the control component in the set of programs; and waiting for a next monitoring cycle;

calculating a difference in the operation count since a previous measurement for the current process; and dividing the difference by an actual time between the previous and the current measurements to provide the individual operation rate.

7. The article of manufacture of claim 6 wherein the data causing the machine to perform selecting the control component comprises data that, when accessed by the machine, causes the machine to perform operations comprising:

adjusting the current baseline statistics by a percentage of baseline representing a size of a next job relative to a corresponding baseline value;

calculating completion times for the N performance components using the adjusted current baseline statistics and the individual operation rates;

comparing the completion times with the configured goal to determine N goal variances; and selecting the control component being one of the N performance components having a largest variance from the N goal variances.

8. The article of manufacture of claim 6 wherein the data causing the machine to perform applying the control value comprises data that, when accessed by the machine, causes the machine to perform operations comprising:

calculating the control value corresponding to the control component; and calling a set-status procedure to applying set the control value to each program the operation in the set of programs.

9. The article of manufacture of claim 6 wherein the N performance components include at least more than one of a processor time component, an input/output (IO) component, and a database management component.

10. The article of manufacture of claim 6 wherein the data causing the machine to perform obtaining the current baseline statistics comprises data that, when accessed by the machine, causes the machine to perform operations comprising:

performing at least one monitoring execution of the set of programs.

11. A system comprising:

a user interface unit to interface to a user; and a workload management (WLM) host unit coupled to the user interface unit, the WLM host unit including a workload performance manager (WPM) comprising:

a baseline module to obtain current baseline statistics on N performance components for a set of programs belonging to a single workload group, a measurement module to obtain N current component performance values associated with the N performance components in a current measurement for the set of programs at beginning of a current monitoring cycle, an operation count module to call a get-status procedure for the current monitoring cycle to obtain an operation count corresponding to one of the N performance components for a current process in the set of programs;

an operation rate module comprising a subtractor to calculate a difference in the operation count since a previous measurement for the current process, and a divider to divide the difference by an actual time between the previous and the current measurements to provide the individual operation rate configured to determine an individual operation rate using the operation count for the current process;

an adder to add individual operation rates for the set of programs to provide a total operation rate, the total operation rate corresponding to a current component performance value of the N current component performance values, the current component performance value being associated with the one of the N performance components;

a selection module coupled to the baseline module and the measurement module to select a control component from the N performance components based on the current baseline statistics, the N current component performance values, and a configured goal for a desired completion time, a control application module coupled to the selection module to apply a control value to an operation corresponding to the control component in the set of programs; and a wait module to wait for a next monitoring cycle.

12. The system of claim 11 wherein the selection module comprises:

a baseline adjuster to adjust the current baseline statistics by a percentage of baseline representing a size of a next job relative to a corresponding baseline value;

a completion time calculator coupled to the baseline adjuster to calculate completion times for the N performance components using the adjusted current baseline statistics and the individual operation rates;

a comparator coupled to the completion time calculator to compare the completion times with the configured goal to determine N goal variances; and a selector to select the control component being one of the N performance components having a largest variance from the N goal variances.

13. The system of claim 11 wherein the control application module comprises:

a control value calculator to calculate the control value corresponding to the control component; and a control value setting module to call a set-status procedure to applyset the control value to each program to the operation in the set of programs.

14. The system of claim 11 wherein the N performance components include at least more than one of a processor time component, an input/output (IO) component, and a database management component.

15. The system of claim 11 wherein the baseline module performs at least one monitoring execution of the set of programs.

\* \* \* \* \*